US012068541B2

(12) United States Patent
Okajima

(10) Patent No.: US 12,068,541 B2
(45) Date of Patent: Aug. 20, 2024

(54) ANTENNA DEVICE AND COMMUNICATION DEVICE

(71) Applicant: Murata Manufacturing Co., Ltd., Nagaokakyo (JP)

(72) Inventor: Yusuke Okajima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 312 days.

(21) Appl. No.: 17/465,876

(22) Filed: Sep. 3, 2021

(65) Prior Publication Data

US 2021/0399437 A1 Dec. 23, 2021

Related U.S. Application Data

(63) Continuation of application No. PCT/JP2020/008116, filed on Feb. 27, 2020.

(30) Foreign Application Priority Data

Mar. 4, 2019 (JP) ................................ 2019-038862

(51) Int. Cl.
*H01Q 21/06* (2006.01)
*H01Q 1/22* (2006.01)
*H01Q 19/10* (2006.01)

(52) U.S. Cl.
CPC ......... *H01Q 21/065* (2013.01); *H01Q 1/2283* (2013.01); *H01Q 19/102* (2013.01)

(58) Field of Classification Search
CPC .......... H01Q 1/2283; H01Q 1/40; H01Q 1/52; H01Q 9/0414; H01Q 19/102; H01Q 21/065
See application file for complete search history.

(56) References Cited

U.S. PATENT DOCUMENTS

| | | | | |
|---|---|---|---|---|
| 6,211,824 | B1 * | 4/2001 | Holden | H01Q 9/0414 343/846 |
| 11,056,800 | B2 * | 7/2021 | Asrani | H01Q 21/0087 |
| 11,201,396 | B2 * | 12/2021 | Park | H01Q 1/526 |
| 11,721,892 | B2 * | 8/2023 | Johansson | H01Q 1/521 343/700 MS |

(Continued)

FOREIGN PATENT DOCUMENTS

| | | |
|---|---|---|
| JP | 1-143506 A | 6/1989 |
| JP | 7-183720 A | 7/1995 |

(Continued)

OTHER PUBLICATIONS

International Search Report and Written Opinion mailed on May 26, 2020, received for PCT Application PCT/JP2020/008116, Filed on Feb. 27, 2020, 9 pages including English Translation.

(Continued)

*Primary Examiner* — Raymond R Chai
(74) *Attorney, Agent, or Firm* — XSENSUS LLP

(57) ABSTRACT

An antenna device includes a dielectric substrate and a plurality of radiating elements that each have a flat profile. A groove, continuous or segmented, is formed in the dielectric substrate to surround the radiating element in plan view. Another groove, continuous or segmented, is formed around another radiating element. The radiating element and the another radiating element are adjacent to one another.

17 Claims, 12 Drawing Sheets

(56) References Cited

U.S. PATENT DOCUMENTS

| | | | | |
|---|---|---|---|---|
| 11,966,247 | B1 * | 4/2024 | Cicili | G05F 3/205 |
| 2021/0257739 | A1 * | 8/2021 | Mathews | H01Q 21/0025 |
| 2021/0359404 | A1 * | 11/2021 | Johansson | H01Q 21/065 |
| 2022/0166333 | A1 * | 5/2022 | Su | H02M 3/33592 |

FOREIGN PATENT DOCUMENTS

| | | | |
|---|---|---|---|
| JP | 9-107226 | A | 4/1997 |
| JP | 2003-283239 | A | 10/2003 |
| JP | 2008-72659 | A | 3/2008 |

OTHER PUBLICATIONS

Office Action issued on May 31, 2023, in corresponding Chinese patent Application No. 202080018863.5, 14 pages.
Written Opinion of the International Searching Authority mailed on May 26, 2020, received for PCT Application PCT/JP2020/008116, Filed on Feb. 27, 2020, 6 pages. (Previously filed; submitting English translation only.).

* cited by examiner

ANTENNA DEVICE AND COMMUNICATION DEVICE

CROSS-REFERENCE TO RELATED APPLICATIONS

The present application claims priority to PCT/JP2020/008116, filed Feb. 27, 2020 and JP 2019-038862, filed Mar. 4, 2019, the entire contents of each are incorporated herein by reference.

TECHNICAL FIELD

The present disclosure relates to an antenna device and a communication device.

BACKGROUND ART

Patent Document 1 discloses an antenna module in which antenna characteristics are improved by reducing surface acoustic waves radiated from a substrate terminal of an antenna incorporated type module substrate. The antenna module disclosed in Patent Document 1 includes a patch antenna that is provided on an antenna side of a module substrate and an annular ground plane which is formed to surround the patch antenna. The antenna module is fixed to a casing of communication equipment by connecting the annular ground plane of the antenna module to a ground surface of the casing of the communication equipment with solder.

CITATION LIST

Patent Document

Patent Document 1: Japanese Unexamined Patent Application Publication No. 2008-72659

SUMMARY

Technical Problems

As recognized by the present inventor, in a configuration in which an antenna module is fixed to a supporting member such as a casing with solder, positioning of the antenna module to the casing is unstable and thus there is difficulty in attaching the antenna module with respect to the supporting member. An aspect of the present disclosure is to provide an antenna device and an antenna module that can be easily attached to a supporting member and are capable of reducing surface acoustic waves. Another aspect of the present disclosure is to provide a communication device on which the antenna module is mounted.

Solutions to Problem

According to one aspect of the present disclosure, there is provided an antenna device including a dielectric substrate; and a plurality of radiating elements that each have a flat profile and are supported by the dielectric substrate, wherein the dielectric substrate includes a first groove formed therein that, in a plan view, surrounds a radiating element among the plurality of radiating elements, the first groove being continuous or segmented with breaks between segments, and the dielectric substrate includes one or more additional grooves formed therein that respectively surround remaining radiating elements of the plurality of radiating elements, the one or more additional grooves each being continuous or segmented with breaks between segments, the one or more additional grooves being separate from the first groove.

According to another aspect of the present disclosure, an antenna device includes a dielectric substrate; and a plurality of radiating elements that each have a flat profile and are supported by the dielectric substrate, wherein the dielectric substrate includes a first groove formed therein that, in a plan view, surrounds a radiating element among the plurality of radiating elements, the first groove being continuous or segmented with breaks between segments, the dielectric substrate includes a second groove formed therein that surrounds another radiating element of the plurality of radiating elements, the first groove and the second groove having a shared portion between the radiating element and the another radiating element, and the radiating element and the another radiating element being adjacent to one another.

According to still another aspect of the present disclosure, there is provided communication device including the antenna device discussed in the previous paragraph, and a supporting member to which the antenna device attaches, the supporting member including a convex portion formed as a fence having a shape and width that matches the first groove and the second groove such that the convex portion is received in the first groove and the second groove.

According to yet another aspect of the present disclosure, there is provided an antenna device including a dielectric substrate; and a plurality of radiating elements that each have a flat profile and are supported by the dielectric substrate, wherein the dielectric substrate includes a groove formed therein that, in plan view, has a lattice shape, and respective of the plurality of radiating elements are disposed in separate regions that is partitioned from one another by the groove formed in the lattice shape.

According to yet another aspect of the present disclosure, there is provided communication device including the antenna device discussed in the above paragraph, and a supporting member to which the antenna device attaches, the supporting member including a convex portion formed as a fence having a shape and width that matches the groove formed in the lattice shape.

Advantageous Effects

The groove formed on the dielectric substrate can be utilized for positioning the antenna device. For example, a convex portion corresponding to the groove may be formed on a supporting member to which the antenna device is to be attached. Further, if the groove is filled with a member having high relative permittivity, the member having the high relative permittivity can suppress surface acoustic waves.

DESCRIPTION OF EMBODIMENTS

First Embodiment

An antenna device, an antenna module, and a communication device according to the first embodiment will be described with reference to the drawings from FIG. 1 to FIG. 4.

Figure 1:
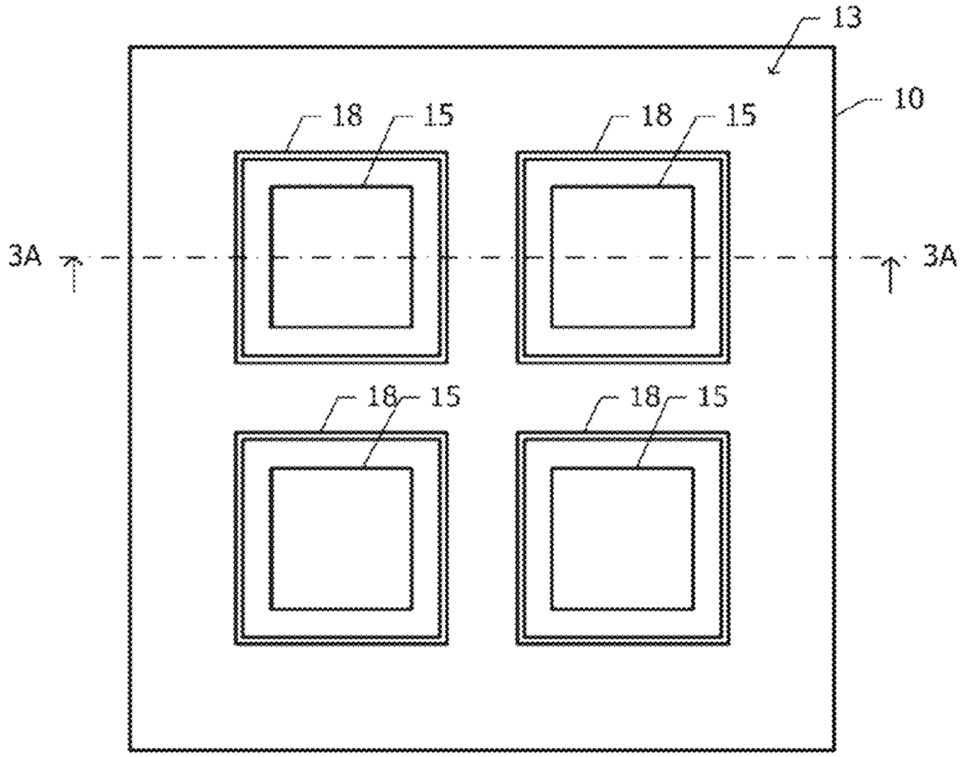
FIG. 1 is a diagram illustrating a planar positional relation between radiating elements and grooves of an antenna device according to a first embodiment.

FIG. 1 is a diagram illustrating a planar positional relation between radiating elements 15 and grooves 18 of an antenna device 10 according to the first embodiment. Four radiating elements 15 having a flat shape (or flat profile) are provided on a first surface 13, which is one surface, of a dielectric surface (FIG. 3) of the antenna device 10. The four radiating elements 15 are arranged in a matrix of two rows and two columns.

Each radiating element 15 has a rectangular or square planar shape whose sides are parallel to each other in the row direction and column direction. Here, each radiating element 15 does not necessarily need to have the planar shape that is geometrically precisely rectangular or square. For example, each radiating element 15 may have a nearly-rectangular planar shape having four sides that partially overlap with respective four sides of a rectangle. Examples of the planar shape may include a planar shape that is obtained by cutting corners of a rectangle out with a triangle and a cross planar shape that is obtained by cutting corners of a rectangle out with a square or the like.

The grooves 18 are formed on the first surface 13 of the antenna device 10 in a manner to correspond to the radiating elements 15 respectively. Each groove 18 is formed in a manner to surround the radiating element 15 in plan view. For example, the groove 18 is formed along an outer circumference of a rectangle or square that has sides parallel to respective sides of the radiating element 15. Moreover, the length of the groove 18 is longer than the outer circumference of the radiating element 15, such that radiating element 15 is contained within a footprint of an area defined by the groove 18.

Figure 2:
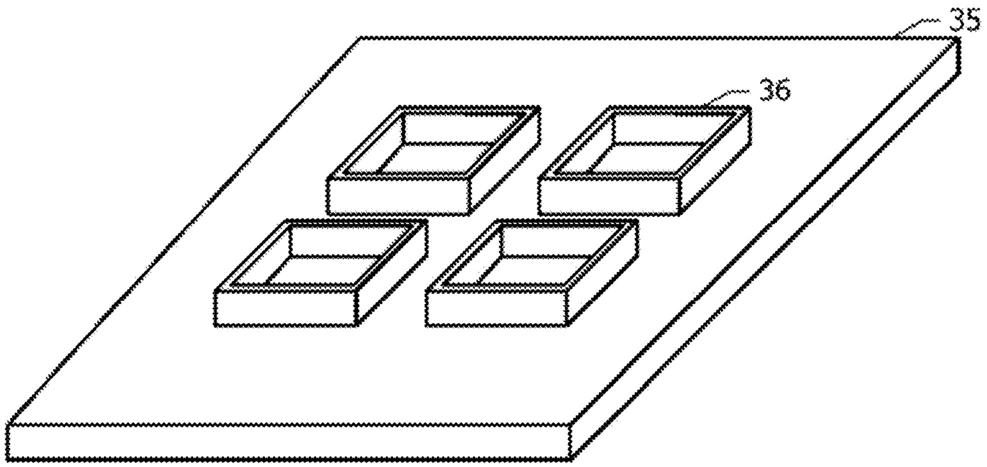
FIG. 2 is a perspective view of a supporting member, such as a casing on which the antenna device according to the first embodiment is mounted, and convex portions.

FIG. 2 is a perspective view of a supporting member 35, on which the antenna device 10 according to the first embodiment is mounted, and convex portions 36. The supporting member 35 is a casing or the like of communication equipment on which the antenna device 10 is to be mounted, for example, and the supporting member 35 is made of insulating resin. FIG. 2 illustrates a surface that faces the antenna device 10. A plurality of convex portions 36 extend from the surface of the supporting member 35 toward the antenna device 10 (not shown in FIG. 2). In plan view, the convex portion 36 has a planar shape that is nearly accorded with the groove 18 of the antenna device 10. From the perspective view of FIG. 2, each convex portion 36 appears as an annular fence.

Figure 3A:
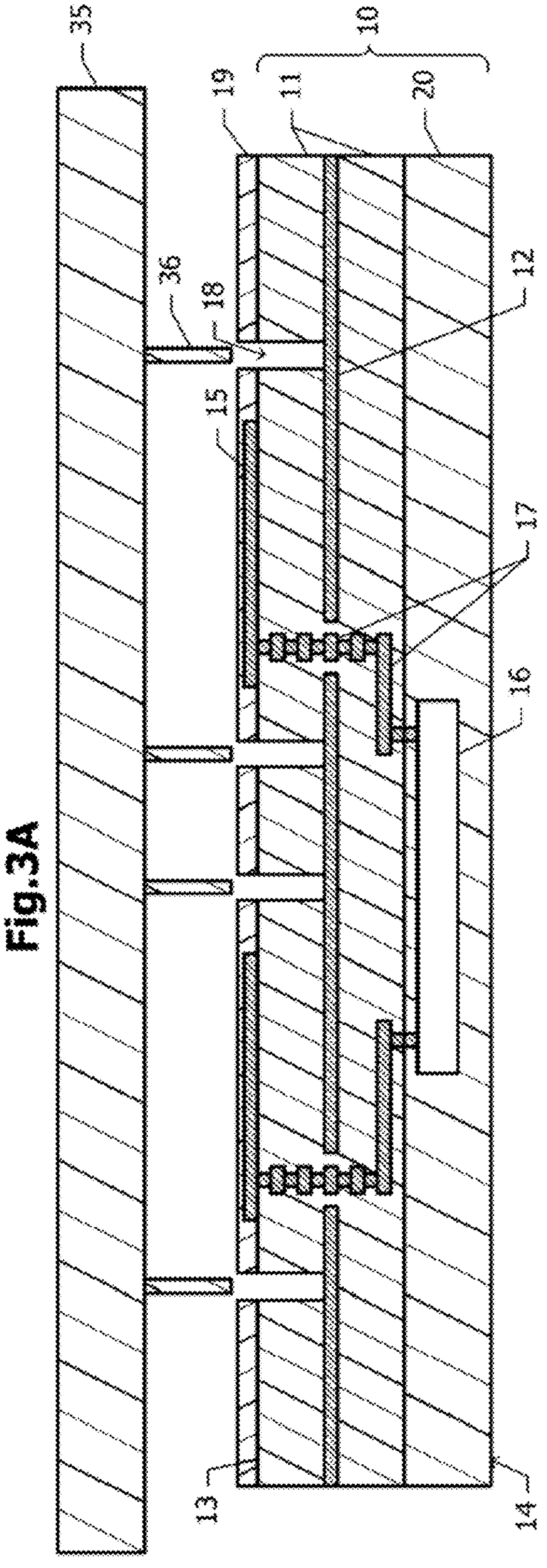
FIG. 3A is a sectional view of a communication device according to the first embodiment in a state that the antenna device is not attached to the supporting member.
Figure 3B:
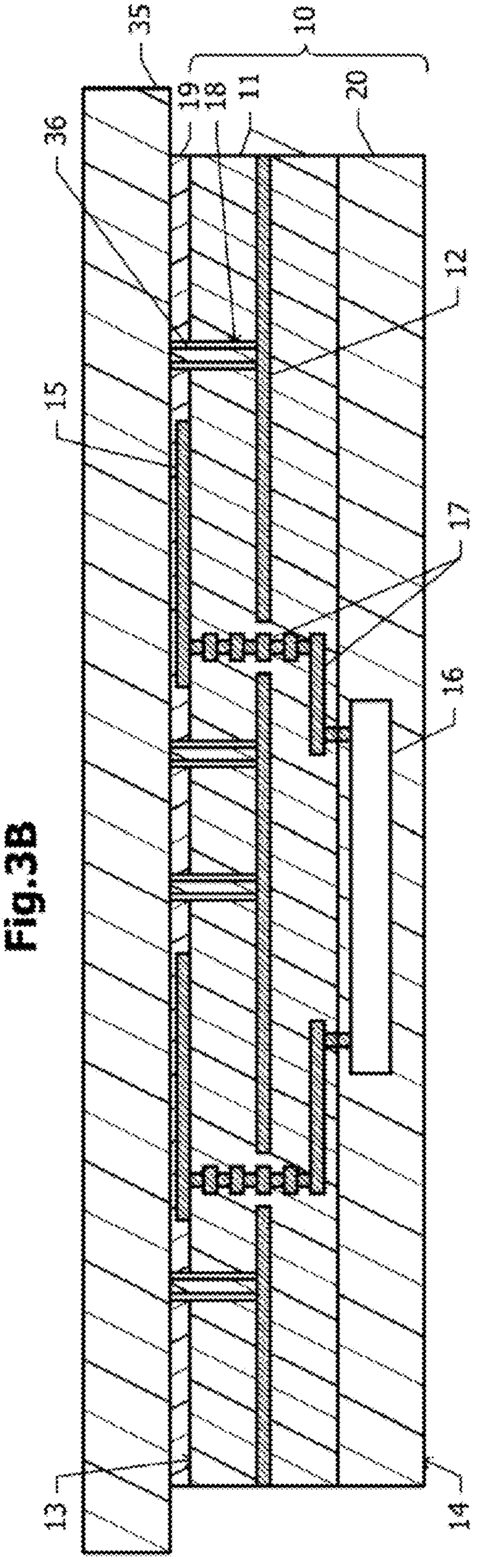
FIG. 3B is a sectional view of the communication device according to the first embodiment in a state that the antenna device is attached to the supporting member.

FIG. 3A and FIG. 3B are sectional views of the communication device taken along a dashed-dotted line 3A-3A of FIG. 1. The communication device according to the first embodiment includes the antenna device 10 and the supporting member 35. FIG. 3A illustrates a state where the antenna device 10 is not attached to the supporting member 35, and FIG. 3B illustrates a state where the antenna device 10 is attached to the supporting member 35, and the convex portions 36 are received in the grooves 18.

The antenna device 10 includes a dielectric substrate 11, and one surface of the dielectric substrate 11 corresponds to the first surface 13 of the antenna device 10. A ground conductor 12 is disposed on an inner layer of the dielectric substrate 11 and a plurality of radiating elements 15 are arranged on the first surface 13. The radiating elements 15 and the ground conductor 12 constitute a patch antenna. A solder resist film 19 covers the radiating elements 15 and the first surface 13.

A high-frequency integrated circuit element 16 is mounted on an opposite surface to the surface, on which the radiating elements 15 are disposed, of the dielectric substrate 11. As used herein the term "high-frequency" is not intended to refer to the HF band (3 MHz to 30 MHz), but rather radio-frequency such as the quasi-millimeter wave range and the mm wave range, including 24 GHz to 300 GHz. Each of the radiating elements 15 is connected to the high-frequency integrated circuit element 16 via a feeder 17. The feeder 17 is provided in the dielectric substrate 11 and is composed of a conductor pattern and a via conductor. The high-frequency integrated circuit element 16 is sealed with a sealing resin layer 20. A surface of the sealing resin layer 20 constitutes a second surface 14, which is an opposite surface to the first surface 13, on the other side of the antenna device 10 than the first surface 13.

A plurality of grooves 18 are formed on the first surface 13 of the dielectric substrate 11. The grooves 18 reach the ground conductor 12 in the depth direction (the thickness direction).

The supporting member 35 is disposed to face the first surface 13 of the antenna device 10. A plurality of convex portions 36 are provided on the surface, facing the antenna device 10, of the supporting member 35. Lateral surfaces of the convex portion 36 are orthogonal or nearly orthogonal to the surface of the supporting member 35. The convex portion 36 is made of a dielectric material having higher relative permittivity than relative permittivity of the dielectric substrate 11. For example, the relative permittivity of the dielectric substrate 11 is 3.5 and the relative permittivity of the convex portion 36 is 5.0. Optionally, the convex portion 36 may be made of metal, which also has a much higher relative permittivity (nearly infinite) than the dielectric substrate. The flat-cross sectional dimension of the convex portion 36 is nearly the same as the flat-cross sectional dimension of the groove 18. FIG. 3B is illustrated as if a cavity is present between lateral surfaces of the convex portion 36 and lateral surfaces of the groove 18 so as to distinguish the convex portion 36 from the groove 18. However, the lateral surfaces of these two are practically, or entirely, in contact with each other.

The plurality of convex portions 36 of the supporting member 35 are respectively inserted into the grooves 18 of the antenna device 10 and the antenna device 10 is thus positioned and supported with respect to the supporting member 35. In the state that the convex portions 36 are inserted in the grooves 18, a relative position between the antenna device 10 and supporting member 35 is fixed in the direction parallel to the first surface 13.

Figure 4:
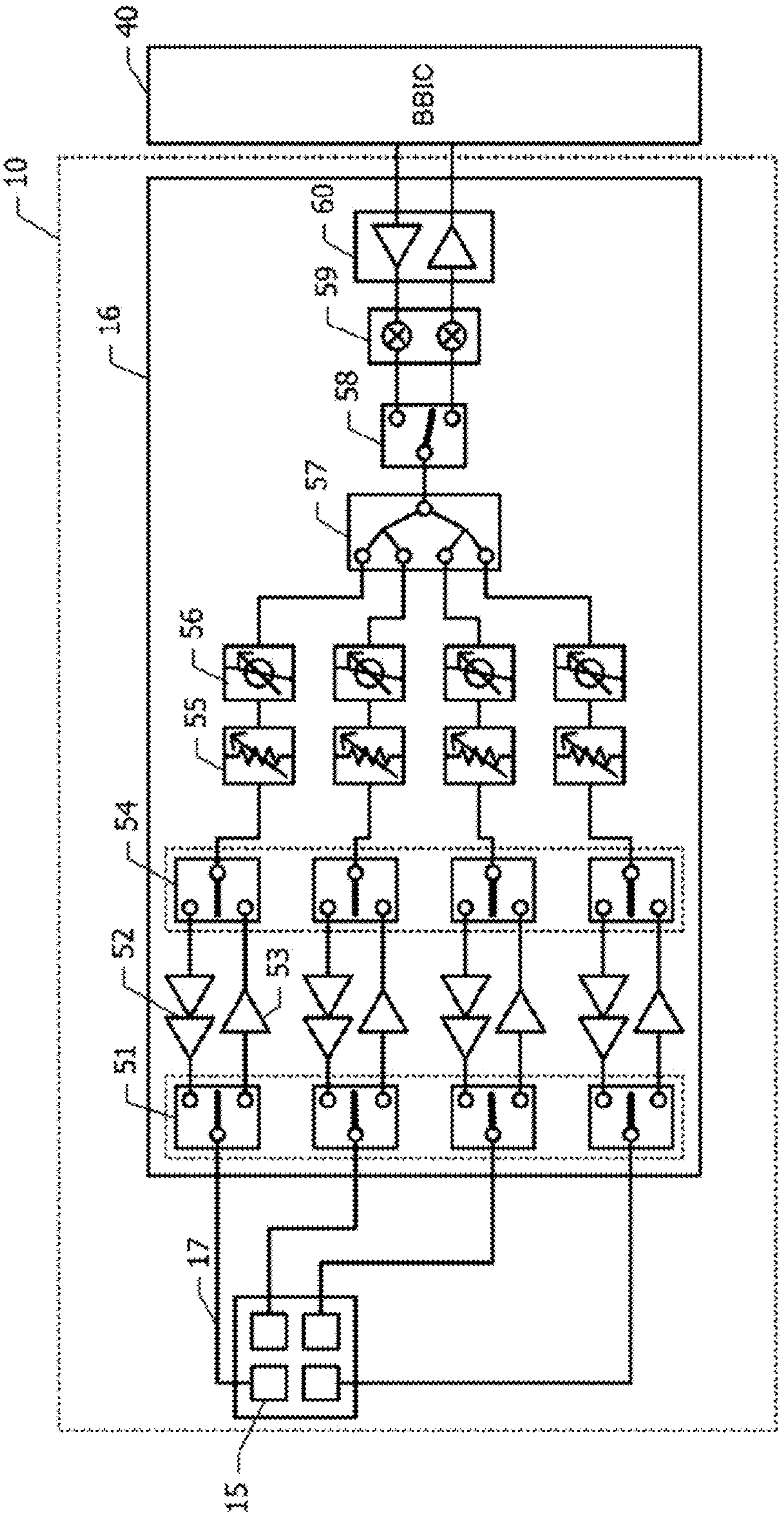
FIG. 4 is a block diagram of the communication device according to the first embodiment.

FIG. 4 is a block diagram of the communication device according to the first embodiment. The communication device according to the first embodiment is mounted on, for example, mobile terminals such as a mobile phone, a smartphone, and a tablet terminal, and personal computers and home appliances that have a communication function. The communication device according to the first embodiment includes the antenna device 10 and a baseband integrated circuit element (BBIC) 40 that performs baseband signal processing.

The antenna device 10 includes an antenna array composed of four radiating elements 15 and the high-frequency integrated circuit element 16. An intermediate frequency signal containing information to be transmitted is inputted into the high-frequency integrated circuit element 16 from the baseband integrated circuit element 40. The high-frequency integrated circuit element 16 up-converts the intermediate frequency signal, inputted from the baseband integrated circuit element 40, into a high frequency signal and supplies the high frequency signal to the plurality of radiating elements 15.

The antenna device 10 on which the high-frequency integrated circuit element 16 is mounted as the first embodiment is sometimes referred to as an antenna module so as to distinguish the antenna device 10 from an antenna device on which a high-frequency integrated circuit element is not mounted. For example, the dielectric substrate 11, and the radiating element 15, feeder 17, and ground conductor 12 which are provided to the dielectric substrate 11 correspond to an antenna device in a narrow sense that does not include the high-frequency integrated circuit element 16. An antenna module (an antenna device in a broad sense) includes an antenna device in a narrow sense and the high-frequency integrated circuit element 16.

Also, the high-frequency integrated circuit element 16 down-converts a high frequency signal received by the four radiating elements 15. An intermediate frequency signal obtained through the down-conversion is inputted into the baseband integrated circuit element 40 from the high-frequency integrated circuit element 16. The baseband integrated circuit element 40 processes the intermediate frequency signal obtained through the down-conversion.

A transmission operation of the high-frequency integrated circuit element 16 will now be described. An intermediate frequency signal is inputted from the baseband integrated circuit element 40 to an up-down converting mixer 59 via an intermediate frequency amplifier 60. A high frequency signal obtained through up-conversion performed by the up-down converting mixer 59 is inputted into a power divider 57 via a transmission-reception changeover switch 58. Each of high frequency signals obtained through division performed by the power divider 57 is supplied to the radiating element 15 via a phase shifter 56, an attenuator 55, a transmission-reception changeover switch 54, a power amplifier 52, a transmission-reception changeover switch 51, and the feeder 17. The phase shifter 56, attenuator 55, transmission-reception changeover switch 54, power amplifier 52, and transmission-reception changeover switch 51, which perform processing of a high frequency signal obtained through division performed by the power divider 57, and the feeder 17 are provided for each radiating element 15.

A reception operation of the high-frequency integrated circuit element 16 will now be described. A high frequency signal that is received by each of the plurality of radiating elements 15 is inputted into the power divider 57 via the feeder 17, the transmission-reception changeover switch 51, a low-noise amplifier 53, the transmission-reception changeover switch 54, the attenuator 55, and the phase shifter 56. A high frequency signal obtained through synthesization performed by the power divider 57 is inputted into the up-down converting mixer 59 via the transmission-reception changeover switch 58. An intermediate frequency signal obtained through down-conversion performed by the up-down converting mixer 59 is inputted into the baseband integrated circuit element 40 via the intermediate frequency amplifier 60.

Here, the configuration may be employed such that a baseband signal is transmitted and received instead of an intermediate frequency signal between the high-frequency integrated circuit element 16 and the baseband integrated circuit element 40. In this case, the high-frequency integrated circuit element 16 performs direct up-down conversion.

The high-frequency integrated circuit element 16 is provided as a one chip integrated circuit component having the above-described function, for example. Alternatively, the phase shifter 56, attenuator 55, transmission-reception changeover switch 54, power amplifier 52, low-noise amplifier 53, and transmission-reception changeover switch 51 that correspond to the radiating element 15 may be provided as a one chip integrated circuit component for each radiating element 15.

Advantageous effects of the first embodiment will now be described.

In the first embodiment, when the antenna device 10 is attached to the supporting member 35, the convex portions 36 are inserted into the grooves 18 of the antenna device 10. Accordingly, the antenna device 10 can be easily positioned with respect to the supporting member 35 in the direction orthogonal to the normal direction of the first surface 13 of the antenna device 10.

The flat-cross sectional dimension of the convex portion 36 is nearly the same as the flat-cross sectional dimension of the groove 18. Accordingly, when press-fit into the groove 18, the lateral surfaces of the convex portion 36 and the lateral surfaces of the groove 18 contact each other and a friction force acts between these two. With this friction force, the antenna device 10 can be held in place by the supporting member 35 so as to not fall off easily.

Further, the convex portion 36, which is made of dielectric having a higher relative permittivity than the relative permittivity of the dielectric substrate 11 (or in another embodiment made of metal), surrounds the radiating element 15 in plan view, thereby being able to suppress surface acoustic waves radiated from the radiating element 15. Furthermore, isolation between the radiating elements 15 can be enhanced. Accordingly, radiation of radio waves from a secondary wave source can be suppressed.

It is preferable to set the relative permittivity of the convex portion 36 higher than the relative permittivity of the dielectric substrate 11 as much as possible so as to obtain sufficient effects of suppressing surface acoustic waves and of enhancing isolation. For example, the difference between the relative permittivity of the convex portion 36 and the relative permittivity of the dielectric substrate 11 is preferably set to 5 or greater. Here, relative permittivity means a value of the radiating element 15 in a resonant frequency band. Permittivity of metal can be considered to be substantially infinite, so it can be said that the difference between the relative permittivity of the convex portion 36 and the relative permittivity of the dielectric substrate 11 is 5 or greater also when the convex portion 36 is made of metal.

When the supporting member 35 is made of a dielectric material having a sufficiently-high relative permittivity, the supporting member 35 and the convex portions 36 may be integrally formed. When the supporting member 35 does not have a sufficiently-high relative permittivity, the supporting member 35 and the convex portions 36 may be formed with mutually-different materials. In this case, the convex portions 36 may be fixed to the supporting member 35 with adhesive or the like. For example, ABS resin, polycarbonate, or the like may be used for the supporting member 35 and high permittivity polymer, metal, or the like may be used for the convex portions 36.

A modification of the first embodiment will now be described. The high-frequency integrated circuit element 16 (FIG. 3A, FIG. 3B) is mounted on the dielectric substrate 11, in the first embodiment. However, the configuration may be employed such that a high frequency signal is inputted from the outside without mounting the high-frequency integrated circuit element 16 on the dielectric substrate 11. The antenna device according to the present modification corresponds to an antenna device in a narrow sense that does not include a high-frequency integrated circuit element.

The groove 18 reaches the ground conductor 12 in the first embodiment, but the configuration may also be employed so the groove 18 does not reach the ground conductor 12. The groove 18 may also be configured to penetrate through the ground conductor 12. Further, a part of the convex portion 36 having high relative permittivity may be embedded in the supporting member 35 having lower relative permittivity than the convex portion 36.

Four radiating elements 15 are provided in the first embodiment, but it is sufficient to provide at least one radiating element 15. In the first embodiment, the radiating element 15 is formed with a single conductor pattern. However, a plurality of conductor patterns may be stacked to configure a stack type patch antenna. Also, the configuration may be employed such that a feed element and a parasitic element are disposed on the same plane.

One feed point is provided for the radiating element 15, in the first embodiment. However, two feed points may be provided to configure a bipolarized antenna. The high-frequency integrated circuit element 16 may be mounted on the same surface as the surface of the dielectric substrate 11 on which the radiating elements 15 are provided. Further, an antenna device in a narrow sense may be configured without mounting the high-frequency integrated circuit element 16 on the dielectric substrate 11.

The surface of the sealing resin layer 20 may be covered by a shielding member such as a shielding case. Further, the high-frequency integrated circuit element 16 does not necessarily have to be sealed with the sealing resin layer 20. The high-frequency integrated circuit element 16 which is not sealed with the sealing resin layer 20 may be covered by a shielding member such as a shielding case.

It is favorable that the radiating elements 15 resonate in a sub-millimeter wave band and millimeter wave band and the communication device according to the first embodiment transmits/receives high frequency signals of the sub-millimeter wave band and millimeter wave band. Here, the sub-millimeter wave band and millimeter wave band mean frequency bands of a frequency from 20 GHz to 300 GHz inclusive.

Second Embodiment

An antenna device, an antenna module, and a communication device according to the second embodiment will now be described with reference to the drawings from FIG. 5 to FIG. 7B. A description will be omitted below for the configurations common to those of the antenna device, antenna module, and communication device according to the first embodiment (FIG. 1, FIG. 2, FIG. 3A, FIG. 3B, FIG. 4).

Figure 5:
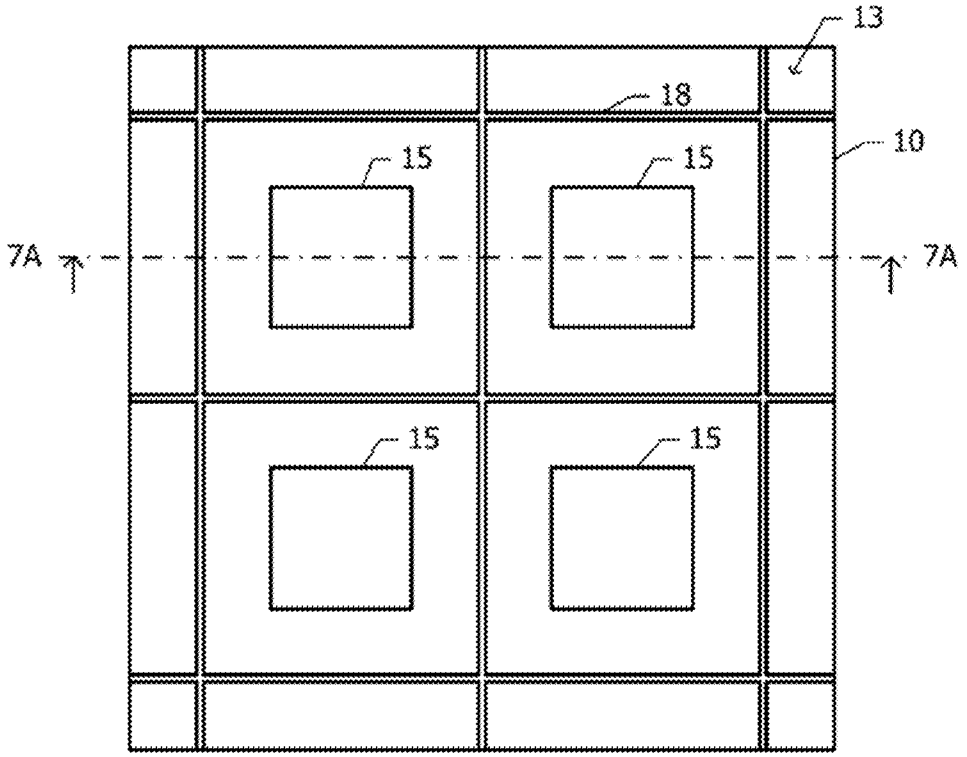
FIG. 5 is a diagram illustrating a planar positional relation between radiating elements and a groove of an antenna device according to a second embodiment.

FIG. 5 is a diagram illustrating a planar positional relation between the radiating elements 15 and groove 18 of the antenna device 10 according to the second embodiment. The annular groove 18 is formed for each radiating element 15 in the first embodiment. On the other hand, the groove 18 is formed in a square lattice shape in the second embodiment. The radiating elements 15 are respectively disposed in a plurality of regions partitioned by the groove 18 formed in the square lattice shape. In this case, the groove 18 is shared between two radiating elements 15 adjacent to each other as the groove 18 surrounding one radiating element 15 and the groove 18 surrounding the other radiating element 15.

Figure 6:
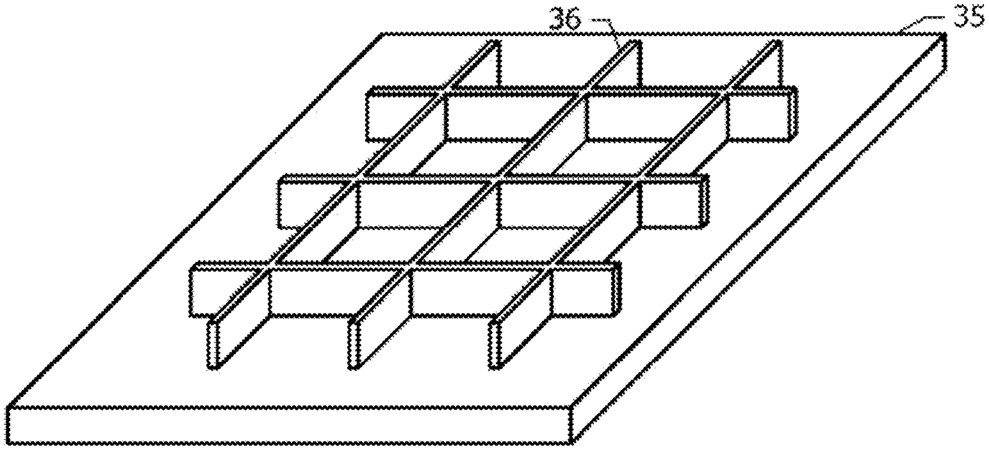
FIG. 6 is a perspective view of a supporting member and a convex portion of a communication device according to the second embodiment.

FIG. 6 is a perspective view of the supporting member 35 and the convex portion 36. The convex portion 36 has a square-lattice planar shape to correspond to the planar shape of the groove 18 (FIG. 5).

Figure 7A:
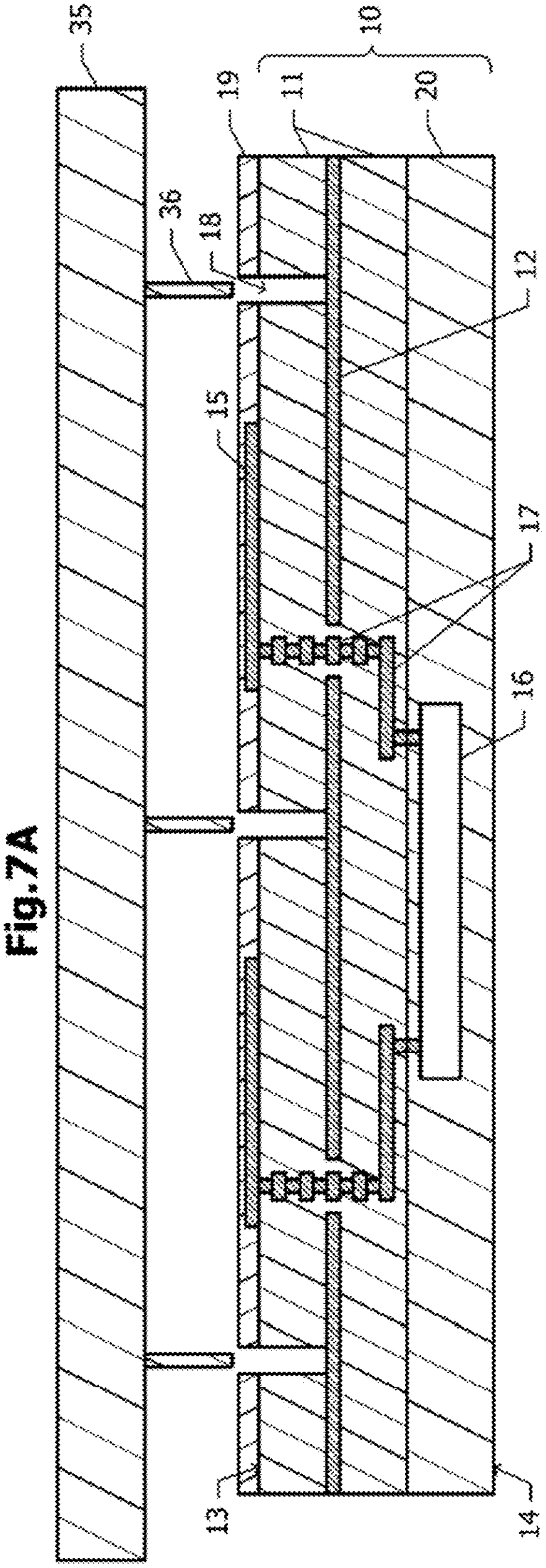
FIG. 7A is a sectional view of a communication device according to the second embodiment in a state that an antenna device is not attached to the supporting member.
Figure 7B:
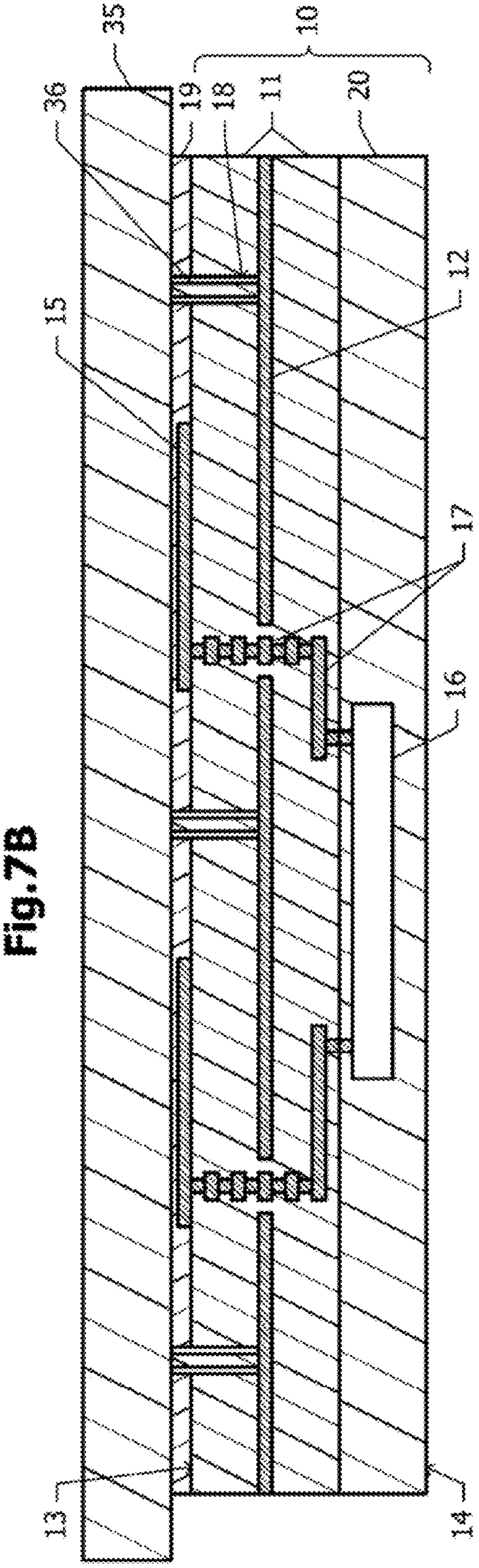
FIG. 7B is a sectional view of the communication device according to the second embodiment in a state that the antenna device is attached to the supporting member.

FIG. 7A and FIG. 7B are sectional views of the communication device taken along a dashed-dotted line 7A-7A of FIG. 5. FIG. 7A illustrates a state that the antenna device 10 is not attached to the supporting member 35, and FIG. 7B illustrates a state that the antenna device 10 is attached to the supporting member 35.

In the first embodiment, there are two grooves 18 and two convex portions 36 between two radiating elements 15 adjacent to each other (FIG. 3A, FIG. 3B). On the other hand, there are one groove 18 and one convex portion 36 between two radiating elements 15 adjacent to each other, in the second embodiment.

Advantageous effects of the second embodiment will now be described.

The second embodiment also provides the effect of facilitating the positioning of the antenna device 10 with respect to the supporting member 35, the effect of suppressing surface acoustic waves, and the effect of enhancing isolation between the radiating elements 15, as is the case with the first embodiment. Further, the groove 18 can be formed in the square lattice shape by forming a plurality of straight grooves that intersect with each other on the antenna device 10, in the second embodiment. Thus, the groove 18 is more easily formed than the first embodiment.

Further, when the supporting member 35 and the convex portion 36 are formed with mutually-different materials, the convex portion 36 is provided as one component. In the first embodiment, a plurality of convex portions 36 (FIG. 2) have to be fixed on the supporting member 35 while being positioned with relatively high precision. In the second embodiment, the convex portion 36 is provided as one component, facilitating the work for fixing the convex portion 36 with respect to the supporting member 35.

Third Embodiment

An antenna device, an antenna module, and a communication device according to the third embodiment will now be described with reference to FIG. 8A and FIG. 8B. Description will be omitted below for the configurations common to those of the antenna device, antenna module, and communication device according to the second embodiment (FIG. 5, FIG. 6, FIG. 7A, FIG. 7B).

Figure 8A:
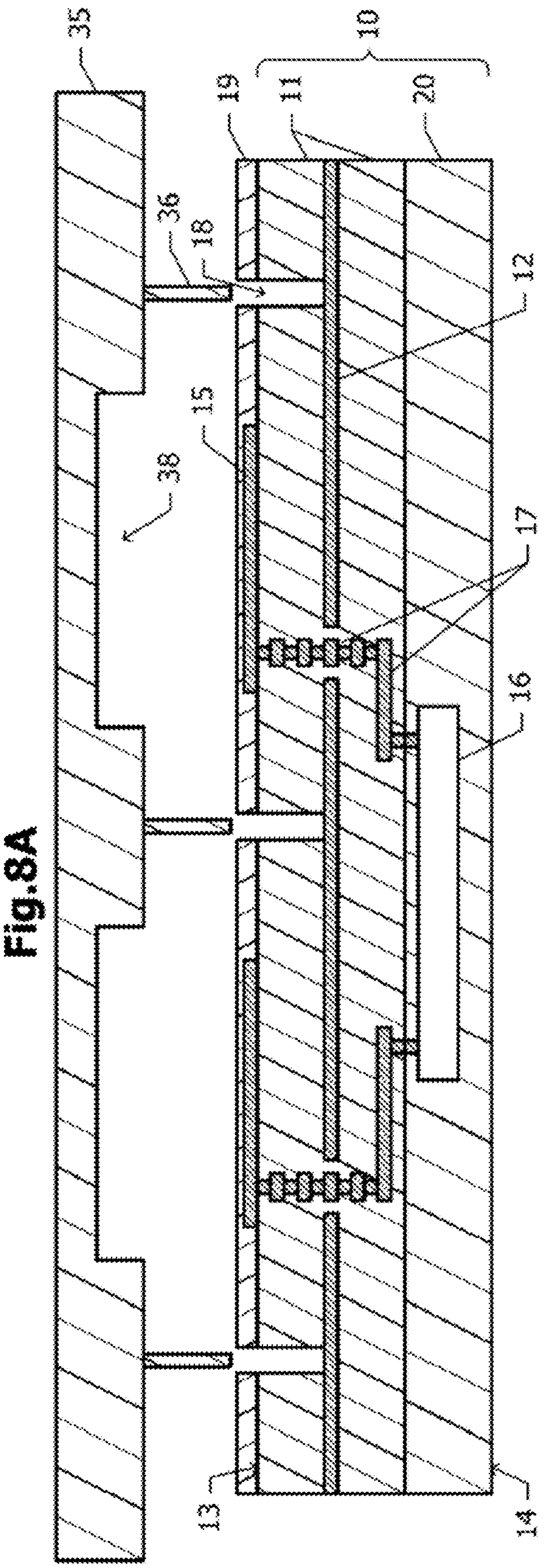
FIG. 8A is a sectional view of a communication device according to a third embodiment in a state that an antenna device is not attached to a supporting member.
Figure 8B:
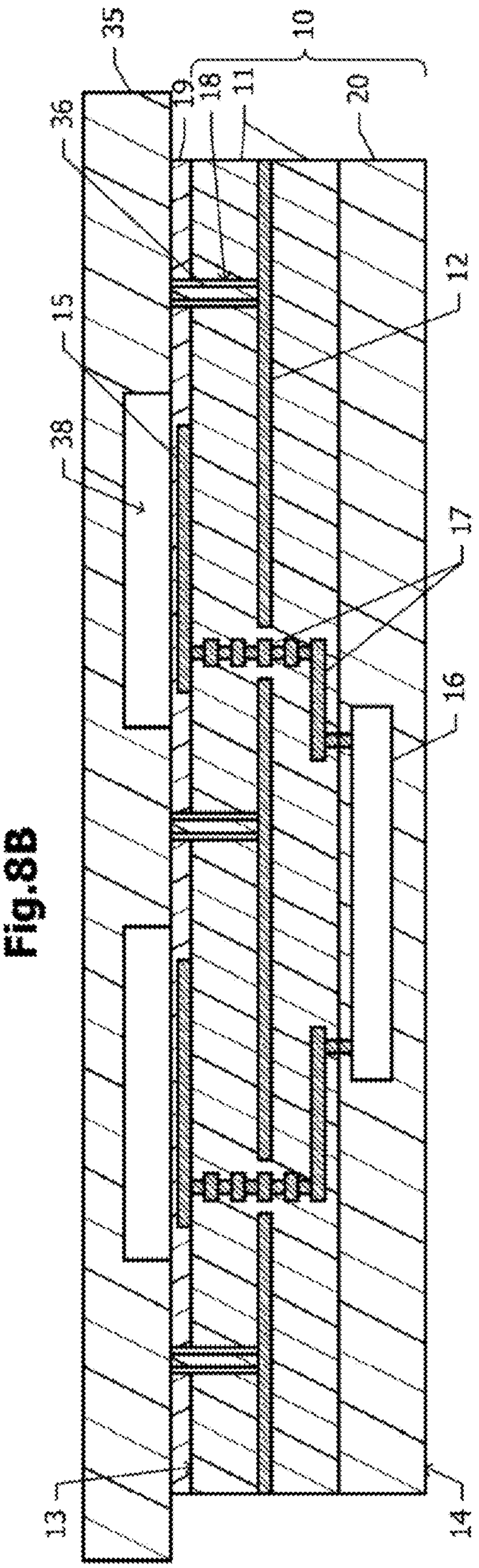
FIG. 8B is a sectional view of the communication device according to the third embodiment in a state that the antenna device is attached to the supporting member.

FIG. 8A is a sectional view of a communication device according to the third embodiment in a state that the antenna device 10 is not attached to the supporting member 35, and FIG. 8B is a sectional view of the communication device according to the third embodiment in a state that the antenna device 10 is attached to the supporting member 35. In the second embodiment, the surface of the supporting member 35 (FIG. 7A, FIG. 7B) facing the antenna device 10 is flat, and the supporting member 35 is in contact with the solder resist film 19 on the radiating elements 15 in the state that the antenna device 10 is attached to the supporting member 35. On the other hand, a plurality of recesses 38 are formed on the surface, facing the antenna device 10, of the supporting member 35, in the third embodiment. The plurality of radiating elements 15 are disposed in the inside of the recesses 38 respectively in plan view.

When the antenna device 10 is attached to the supporting member 35, the solder resist film 19 on the radiating elements 15 is not in contact with the bottom surfaces of the recesses 38 and hollows are thus formed between the solder resist film 19 on the radiating elements 15 and the supporting member 35.

Advantageous effects of the third embodiment will now be described.

The third embodiment also provides the effect of facilitating the positioning of the antenna device 10 with respect to the supporting member 35, the effect of suppressing surface acoustic waves, and the effect of enhancing isolation between the radiating elements 15, as is the case with the second embodiment.

Furthermore, hollows are secured between the solder resist film 19 on the radiating elements 15 and the supporting member 35 in the third embodiment, thereby reducing the influence of the supporting member 35 on the resonance wavelength of the radiating elements 15. To sufficiently obtain this advantageous effect, it is preferable to set an interval between the radiating element 15 and the bottom surface of the recess 38 to 1/10 or greater of the resonance wavelength of the radiating elements 15. For example, when the resonant frequency of the radiating element 15 is 60 GHz, it is preferable to set the interval between the radiating element 15 and the bottom surface of the recess 38 to 5 mm or greater.

Fourth Embodiment

An antenna device, an antenna module, and a communication device according to the fourth embodiment will now be described with reference to FIG. 9A and FIG. 9B. Description will be omitted below for the configurations common to those of the antenna device, antenna module, and communication device according to the third embodiment (FIG. 8A, FIG. 8B).

Figure 9A:
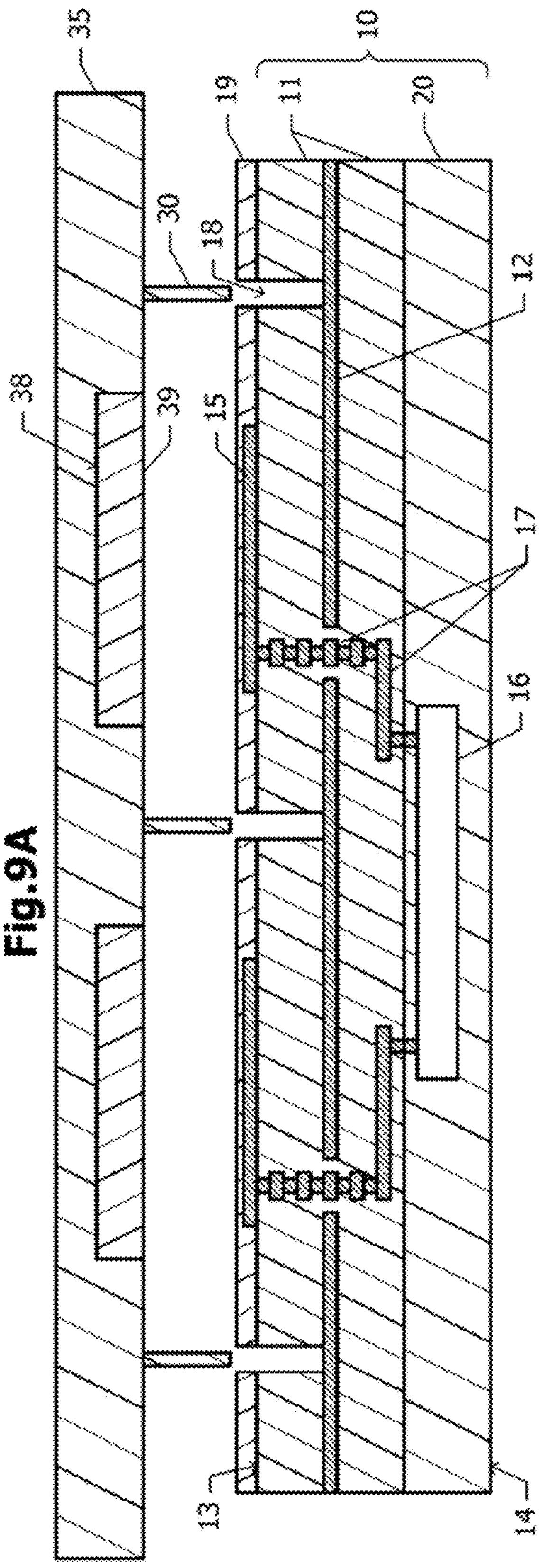
FIG. 9A is a sectional view of a communication device according to a fourth embodiment in a state that an antenna device is not attached to a supporting member.
Figure 9B:
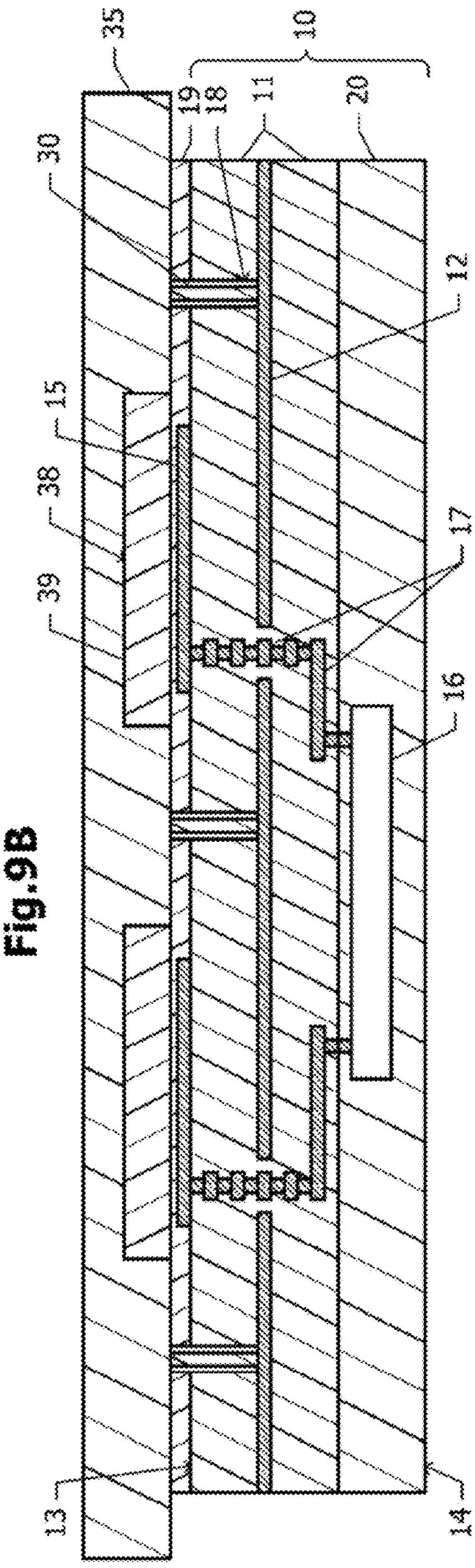
FIG. 9B is a sectional view of the communication device according to the fourth embodiment in a state that the antenna device is attached to the supporting member.

FIG. 9A is a sectional view of a communication device according to the fourth embodiment in a state that the antenna device 10 is not attached to the supporting member 35, and FIG. 9B is a sectional view of the communication device according to the fourth embodiment in a state that the antenna device 10 is attached to the supporting member 35. In the third embodiment, there are hollows between the solder resist film 19 on the radiating elements 15 and the bottom surfaces of the recesses 38 (FIG. 8A, FIG. 8B). On the other hand, low permittivity members 39 are disposed in spaces between the solder resist film 19 on the radiating elements 15 and the bottom surfaces of the recesses 38, in the fourth embodiment. The low permittivity member 39 has lower relative permittivity than the relative permittivity of the supporting member 35. In the state that the antenna device 10 is attached to the supporting member 35, the low permittivity members 39 face the radiating elements 15.

Advantageous effects of the fourth embodiment will now be described. The low permittivity members 39, which have lower relative permittivity than the relative permittivity of the supporting member 35, are disposed between the solder resist film 19 on the radiating elements 15 and the supporting member 35 in the fourth embodiment, thereby reducing the influence of the supporting member 35 on the resonance wavelength of the radiating elements 15. To sufficiently obtain this advantageous effect, it is preferable to set the thickness of the low permittivity member 39 to 1/10 or greater of the resonance wavelength of the radiating elements 15 (the wavelength in the low permittivity member 39).

Fifth Embodiment

An antenna device, an antenna module, and a communication device according to the fifth embodiment will now be described with reference to FIG. 10. Description will be omitted below for the configurations common to those of the antenna device, antenna module, and communication device according to the first embodiment (FIG. 1, FIG. 2, FIG. 3A, FIG. 3B, FIG. 4).

Figure 10:
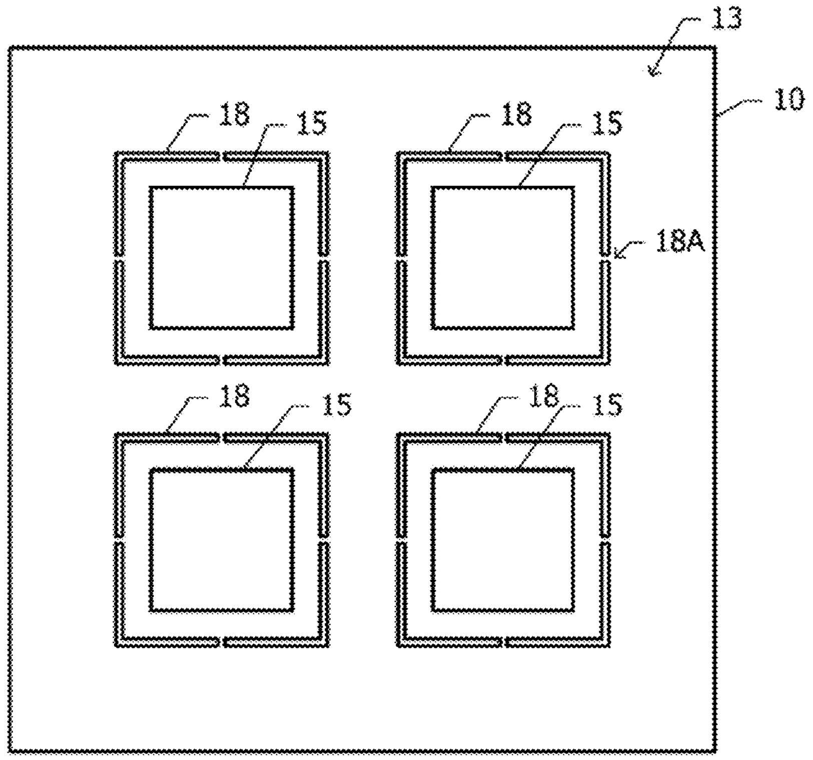
FIG. 10 is a diagram illustrating a planar positional relation between radiating elements and grooves of an antenna device according to a fifth embodiment.

FIG. 10 is a diagram illustrating a planar positional relation between the radiating elements 15 and grooves 18 of the antenna device 10 according to the fifth embodiment. In the first embodiment, the groove 18 formed for each radiating element 15 continuously surrounds the radiating element 15. On the other hand, the groove 18 in FIG. 10 is segmented, with breaks 18A formed between segments of the groove 18 in the fifth embodiment.

Advantageous effects of the fifth embodiment will now be described.

Even though the breaks 18A are formed on the grooves 18 as the fifth embodiment, the effect of positioning the antenna device 10 with respect to the supporting member 35 can be sufficiently obtained. Also, the effect of suppressing surface acoustic waves and the effect of enhancing isolation between the radiating elements 15 can be obtained. In order to obtain the effect of suppressing surface acoustic waves and the effect of enhancing isolation between the radiating elements 15 at the same level as the effects in the first embodiment, the width of the break 18A is preferably set to 1/10 or lower of the resonance wavelength of the radiating elements 15.

Sixth Embodiment

An antenna device, an antenna module, and a communication device according to the sixth embodiment will now be described with reference to FIG. 11 and FIG. 12. Description will be omitted below for the configurations common to those of the antenna device, antenna module, and communication device according to the first embodiment (FIG. 1, FIG. 2, FIG. 3A, FIG. 3B, FIG. 4).

Figure 11:
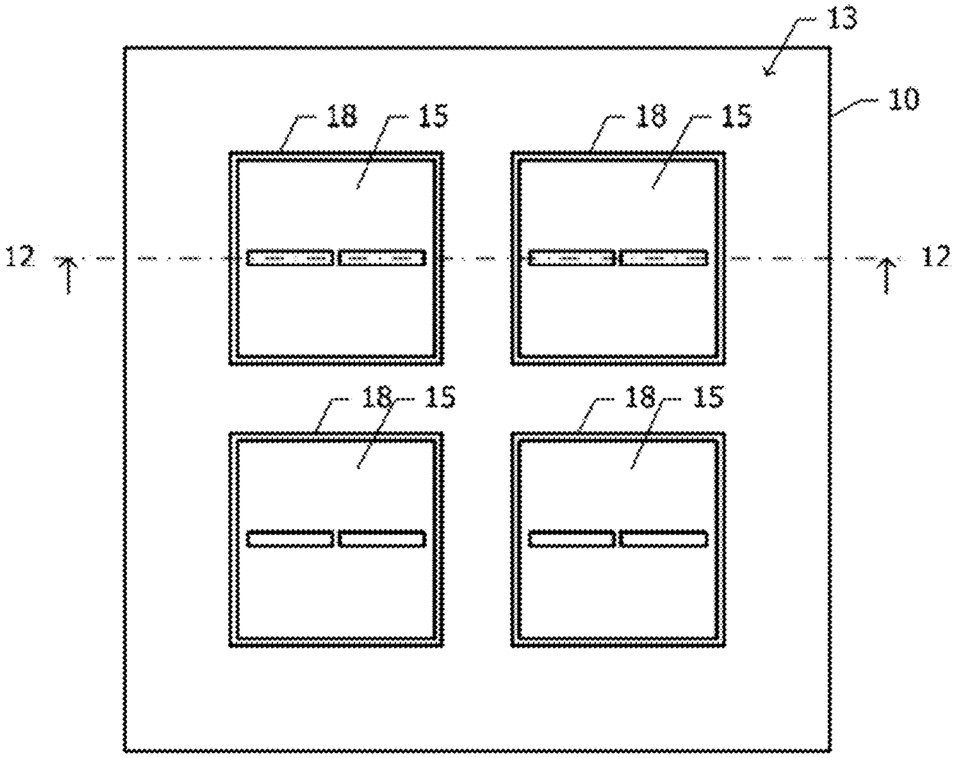
FIG. 11 is a diagram illustrating a planar positional relation between radiating elements 15 and grooves 18 of an antenna device 10 according to a sixth embodiment.
Figure 12:
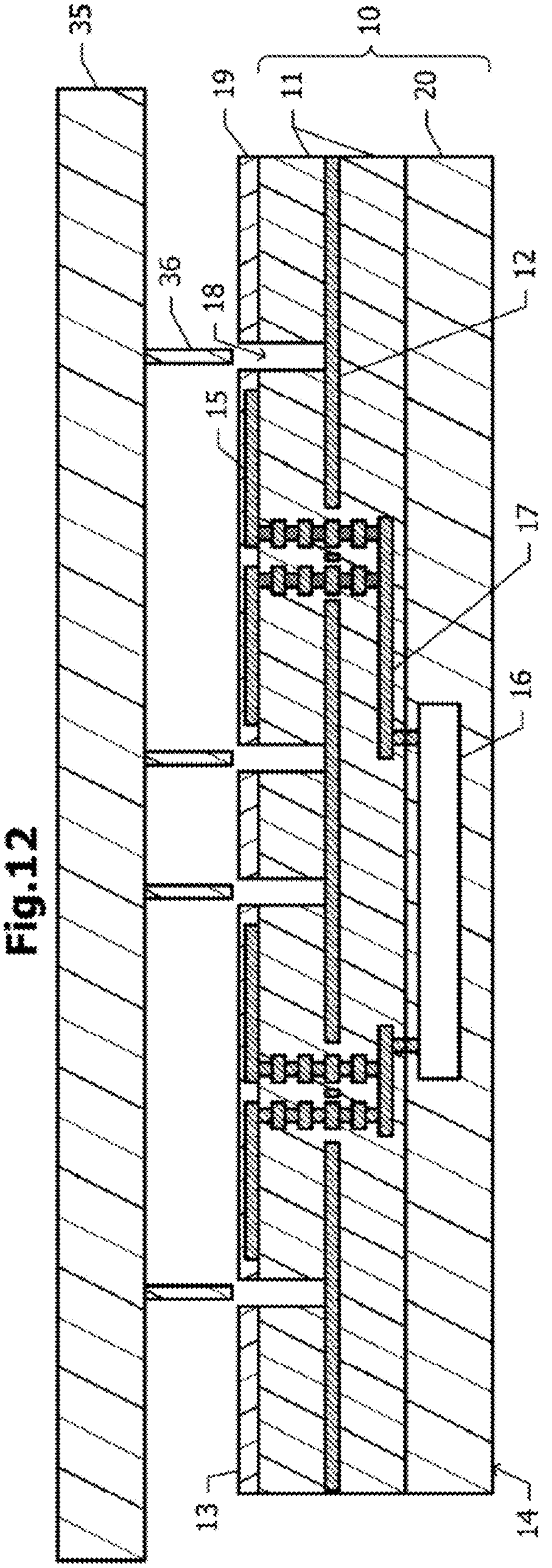
FIG. 12 is a sectional view taken along a dashed-dotted line 12-12 of FIG. 11.

FIG. 11 is a diagram illustrating a planar positional relation between the radiating elements 15 and grooves 18 of the antenna device 10 according to the sixth embodiment. FIG. 12 is a sectional view taken along a dashed-dotted line 12-12 of FIG. 11. In the first embodiment, the radiating elements 15 and the ground conductor 12 (FIG. 1, FIG. 3B) constitute a patch antenna. On the other hand, the radiating element 15 constitutes a dipole antenna in the sixth embodiment.

One dipole antenna includes two straight conductor patterns that are disposed on the first surface 13 of the dielectric substrate 11. These two conductor patterns are arranged along one virtual straight line. The radiating elements 15 constituting respective dipole antennas are surrounded by the grooves 18 respectively in plan view, as is the case with the first embodiment. A high frequency signal is supplied to the radiating element 15 serving as the dipole antenna from the high-frequency integrated circuit element 16 via the feeder 17.

Advantageous effects of the sixth embodiment will now be described.

The sixth embodiment also provides the effect of facilitating the positioning of the antenna device 10 with respect to the supporting member 35, the effect of suppressing surface acoustic waves, and the effect of enhancing isolation between the radiating elements 15, as is the case with the first embodiment.

It goes without saying that each of the above-described embodiments is exemplary and the configurations described in different embodiments can be partially replaced or combined with each other. Similar advantageous effects provided by similar configurations in a plurality of embodiments are not mentioned sequentially in each of the embodiments. Further, the present disclosure is not limited to the above-described embodiments. It is obvious for those skilled in the art that various alterations, improvements, combinations, and the like can be made.

REFERENCE SIGNS LIST

10 antenna device
11 dielectric substrate
12 ground conductor
13 first surface
14 second surface
15 radiating element
16 high-frequency integrated circuit element
17 feeder
18 groove
18A break
19 solder resist film
20 sealing resin layer
35 supporting member
36 convex portion
38 recess
39 low permittivity member
40 baseband integrated circuit element
51 transmission-reception changeover switch
52 power amplifier
53 low-noise amplifier
54 transmission-reception changeover switch
55 attenuator
56 phase shifter
57 power divider
58 transmission-reception changeover switch
59 up-down converting mixer
60 intermediate frequency amplifier

The invention claimed is:

1. A communication device comprising:
an antenna device including:
a dielectric substrate; and
a plurality of radiating elements that each have a flat profile and are supported by the dielectric substrate, wherein
the dielectric substrate includes a first groove formed therein that, in a plan view, surrounds a radiating element among the plurality of radiating elements, the first groove being continuous or segmented with breaks between segments, and
the dielectric substrate includes one or more additional grooves formed therein that respectively surround remaining radiating elements of the plurality of radiating elements, the one or more additional grooves each being continuous or segmented with breaks between segments, the one or more additional grooves being separate from the first groove,
wherein each of the plurality of radiating elements are surrounded by a single groove; and
a supporting member to which the antenna device attaches, the supporting member including a convex portion formed as a fence having a shape and width that matches the first groove and the one or more additional grooves such that the convex portion is received in the first groove and the one or more additional grooves.

2. The communication device according to claim 1, wherein the antenna device further includes:
a high-frequency integrated circuit element mounted on the dielectric substrate and configured to supply a radio frequency signal to the plurality of radiating elements.

3. The communication device according to claim 1, wherein the plurality radiating elements resonate in a frequency band from 20 GHz to 300 GHz inclusive.

4. The communication device according to claim 1, wherein the antenna device is detachable attached to the supporting member by a friction force between convex portion and the first groove and the one or more additional grooves.

5. The communication device according to claim 4, wherein the convex portion has a higher relative permittivity than the dielectric substrate.

6. The communication device according to claim 5, wherein the convex portion is made of a dielectric material or a metal.

7. The communication device according to claim 1, further comprising:
a baseband integrated circuit element that processes an intermediate frequency signal or a baseband signal.

8. A communication device, comprising
an antenna device including:
a dielectric substrate; and
a plurality of radiating elements that each have a flat profile and are supported by the dielectric substrate, wherein
the dielectric substrate includes a first groove formed therein that, in a plan view, surrounds a radiating element among the plurality of radiating elements, the first groove being continuous or segmented with breaks between segments, the dielectric substrate includes a second groove formed therein that surrounds another radiating element of the plurality of radiating elements, the first groove and the second groove having a shared portion between the radiating element and the another radiating element, and the radiating element and the another radiating element being adjacent to one another; and a supporting member to which the antenna device attaches, the supporting member including a convex portion formed as a fence having a shape and width that matches the first groove and the second groove such that the convex portion is received in the first groove and the second groove.

9. The communication device according to claim 8, wherein the antenna device further includes:

a high-frequency integrated circuit element mounted on the dielectric substrate and configured to supply a radio frequency signal to the plurality of radiating elements.

10. The communication device according to claim 8, wherein the plurality radiating elements resonate in a frequency band from 20 GHz to 300 GHz inclusive.

11. The communication device according to claim 8, wherein the antenna device is detachable attached to the supporting member by a friction force between convex portion and the first groove and the second groove.

12. The communication device according to claim 11, wherein the convex portion has a higher relative permittivity than the dielectric substrate.

13. The communication device according to claim 12, wherein the convex portion is made of a dielectric material or a metal.

14. The communication device according to claim 8, further comprising:

a baseband integrated circuit element that processes an intermediate frequency signal or a baseband signal.

15. A communication device, comprising:

an antenna device including:

a dielectric substrate; and a plurality of radiating elements that each have a flat profile and are supported by the dielectric substrate, wherein the dielectric substrate includes a groove formed therein that, in plan view, has a lattice shape, and respective of the plurality of radiating elements are disposed in separate regions that is partitioned from one another by the groove formed in the lattice shape; and a supporting member to which the antenna device attaches, the supporting member including a convex portion formed as a fence having a shape and width that matches the groove formed in the lattice shape.

16. The communication device according to claim 15, wherein the antenna device further includes:

a high-frequency integrated circuit element mounted on the dielectric substrate and configured to supply a radio frequency signal to the plurality of radiating elements, wherein the plurality radiating elements resonate in a frequency band from 20 GHz to 300 GHz inclusive.

17. The communication device according to claim 15, wherein:

the antenna device is detachable attached to the supporting member by a friction force between convex portion and the groove formed in the lattice shape, the convex portion has a higher relative permittivity than the dielectric substrate, and the convex portion is made of a dielectric material or a metal.

* * * * *